United States Patent
Pieragostini et al.

(10) Patent No.: US 6,437,782 B1
(45) Date of Patent: Aug. 20, 2002

(54) METHOD FOR RENDERING SHADOWS WITH BLENDED TRANSPARENCY WITHOUT PRODUCING VISUAL ARTIFACTS IN REAL TIME APPLICATIONS

(75) Inventors: Ian B. Pieragostini, Seattle; Stephen J. Lacey, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/226,336

(22) Filed: Jan. 6, 1999

(51) Int. Cl.[7] ............................................. G06T 15/60
(52) U.S. Cl. ...................... 345/426; 345/427; 345/582; 345/589
(58) Field of Search ................................. 345/418, 419, 345/426, 430, 582, 427, 589

(56) References Cited

U.S. PATENT DOCUMENTS

| | | | | |
|---|---|---|---|---|
| 5,742,749 A | * | 4/1998 | Foran et al. | 345/426 |
| 5,870,097 A | * | 2/1999 | Snyder et al. | 345/426 |
| 5,870,098 A | * | 2/1999 | Gardiner | 345/426 |

* cited by examiner

*Primary Examiner*—Mark Zimmerman
*Assistant Examiner*—Kimbinh T. Nguyen
(74) *Attorney, Agent, or Firm*—Christensen O'Connor Johnson Kindness PLLC

(57) ABSTRACT

A method, system and computer-readable medium for generating a shadow for a three dimensional model without visual artifacts. A shadow of a model is projected onto a shadow plane using a shadow projection matrix and disabling alpha blending, creating a projected shadow model. A three-dimensional (3D) bounding volume of the model is projected onto the shadow plane and clipped against the view frustum. Based on the bounding volume projected onto the shadow plane, a screen extent that encompasses the entire projected bounding volume is determined. A texture map sized in relation to the screen extent is created in memory for storing a texture map. This texture map is cleared to a non-shadow color and a chromakey is set to the non-shadow color. The projected shadow model without alpha blending has its colors and texture set to the desired shadow color. The projected shadow model is then rendered onto the texture map. Thereafter, the projected bounding volume vertices are set to the shadow's alpha value and the texture coordinates of the projected bounding volume vertices are set to evenly map texture into screen space. With prospective texture correction disabled and blended transparency enabled, the projected bounding volume is rendered into the scene with the shadow texture applied.

31 Claims, 12 Drawing Sheets

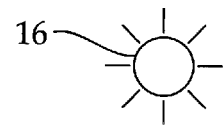
*Figure 9A*
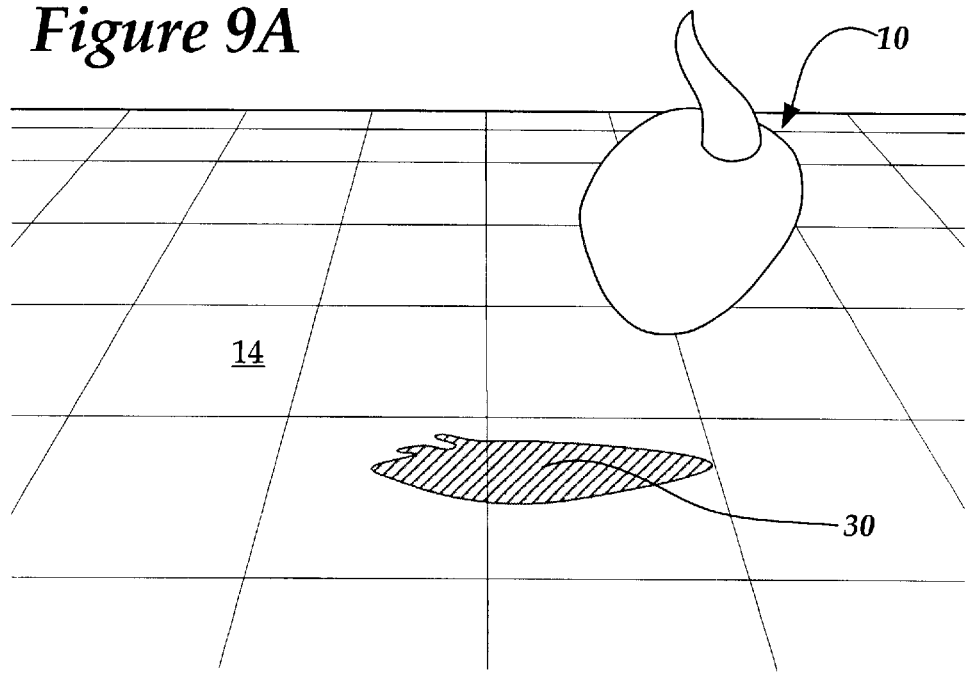
*Figure 9B*
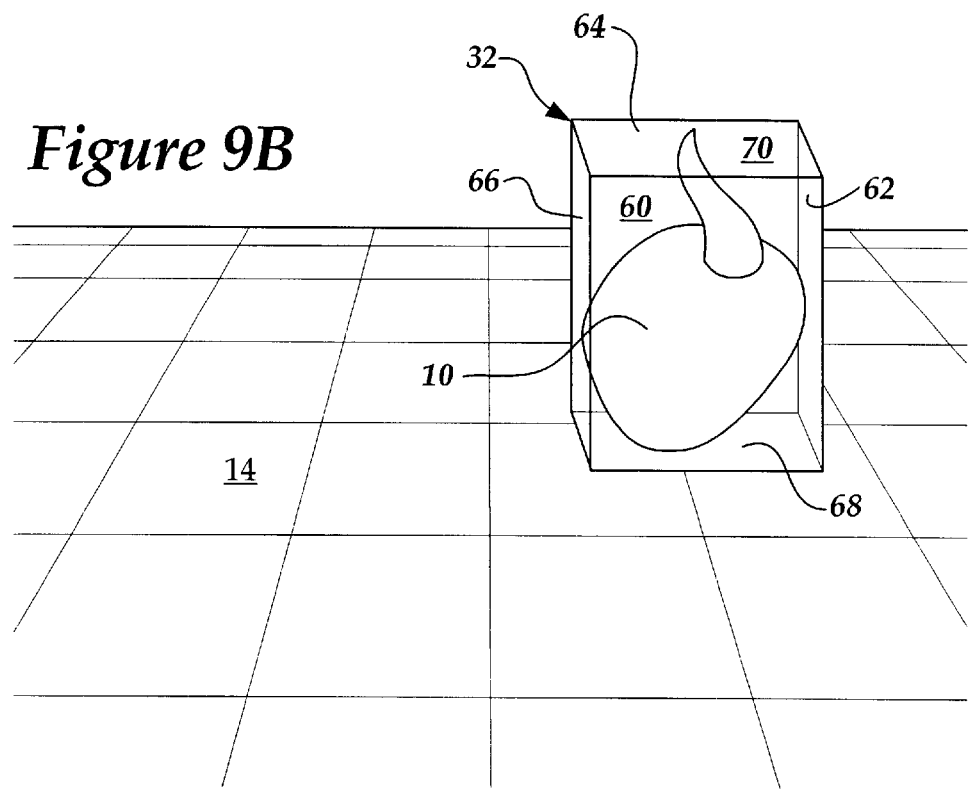

METHOD FOR RENDERING SHADOWS WITH BLENDED TRANSPARENCY WITHOUT PRODUCING VISUAL ARTIFACTS IN REAL TIME APPLICATIONS

FIELD OF THE INVENTION

This invention relates generally to computer graphics systems, and, more particularly, to rendering shadows generated by computer graphics systems.

BACKGROUND OF THE INVENTION

The entertainment and advertising industries have made computer-generated animations common place today in movie special effects and in commercials, respectively. In addition, games and visual simulations have also created consumer interest in realistic images and animations. Typically, in order to create realistic images and animations, a computer must generate a three-dimensional (3D) scene with various objects and then capture the effects of light interacting between each of the various objects. The computer then generates a new, slightly different two-dimensional (2D) view of the scene many times per second, thereby simulating movement and interaction of the various objects. The computer generation of new, slightly different views is commonly referred to as real time 3D graphics.

Typically, the computer generating multiple 2D graphic views in sequence includes specialized hardware usually referred to as a graphics display processor. The combination of an integrated computer with a display processor is commonly known as a graphics workstation. A graphics workstation runs a 3D graphics application that provides various techniques for simulating the movement and interaction of various objects. Simulating shadows caused by the interaction of the various objects is very desirable because shadows convey a large amount of information necessary for conveying the 3D nature of rendered objects and for adding realism to the computer generated sequence of 2D views. Therefore, a 3D graphics workstation typically provides a technique for generating shadows of 3D objects and rendering these objects along with their shadows onto a 2D view.

Various methods of rendering shadows have been proposed. Many of these methods are described in the publication "Computer Graphics Principles and Practice, Second Edition in C", Foley et al., Addison-Wesley Publishing Company, Inc., pp. 745–753. Examples of some computationally intense methods of rendering shadows are the two-pass z-buffer shadow method described in an article entitled "Casting Curved Shadows on Curved Surfaces," Williams, L., Proceedings of SIGGRAPH '78, pp. 270–274 which is also described on pp. 751–753 of the above mentioned publication and the shadow volume method described in an article entitled "Shadow Algorithms for Computer Graphics," Crow, F. C., Proceedings of SIGGRAPH '77, pp. 442–448 which is also described on pp. 749 of above mentioned publication.

In general, the two-pass z-buffer method involves generating a z-buffer (a shadow map) for an image from a viewpoint of a light (a light coordinate system) with values in the z-buffer representing distances from the light to the object (i.e. closer objects will have a value indicating a higher intensity than farther away objects). A second pass generates a z-buffer for the image from the viewpoint of an observer (an observer coordinate system) using a well known z-buffer algorithm along with a modification that transforms a pixel's observer coordinates into light coordinates whenever that pixel is determined to be visible. Therefore, computations for shadow calculations must be performed for each pixel even if the pixel is ultimately painted over by closer objects. In addition, computations for transforming an object coordinate to light coordinate for every pixel must be performed.

The shadow volume method involves the generation of a shadow volume determined by a volume that is blocked from a light source by an object. A point (or pixel) is then determined to be in shadow by assigning each front-facing shadow polygon a value of +1 and each back-facing shadow polygon a value of −1, and using a counter to increment or decrement accordingly to determine whether the point is in shadow. Because the shadow volume does not require any translation of coordinate systems, the method is fairly efficient to implement if the object is simple. However, if the object is a complex shape, the computation required to calculate the shadow volume becomes very complicated.

Because both the two-pass z-buffer and the shadow volume methods are computationally intense when employed to generate the shadows of complex shaped objects, neither method is desirable for real-time applications. As a result, other, less computationally intense, techniques have been developed. Unfortunately, these other techniques result in poorer quality views because of the introduction of undesirable artifacts. One such other technique is the shadow projection method described in the publication "OpenGL Programming Guide, Second edition," Woo et al., Addison-Wesley Developers Press, pp. 519–521. In general, the shadow projection method uses a shadow projection matrix to find the shadow of an object on an arbitrary plane using an arbitrary light source. This method avoids the computations necessary to translate the coordinates of an object from one coordinate system to another coordinate system.

FIG. 1 illustrates a view generated using the shadow projection method. A teapot model 10 is shown creating a shadow 12 on a shadow plane 14 as a result of the teapot model 10 blocking simulated rays (not shown) from a light source 16. The computer represents the shape of the teapot model 10 by using several polygons (i.e. triangles) that approximate the surface of the teapot model 10, such as a spout polygon 20, a teapot body polygon 22 (and a teapot handle polygon, not viewable in FIG. 1). This modeling of an object is well known in the art and is referred to as polygon mesh or polygonal modeling.

To create the shadow 12, the shadow projection method first multiplies the world coordinates of each polygon representing the teapot model 10 with the shadow projection matrix shown below:

$$\begin{bmatrix} b*dy+c*dz & -a*dy & -a*dz & 0 \\ -b*dx & a*dx+c*dz & -b*dz & 0 \\ -c*dx & -c*dy & a*dx+b*dy & 0 \\ -d*dx & -d*dy & -d*dz & a*dx+b*dy*c*dz \end{bmatrix} \quad (1)$$

where a, b, c, and d are variable obtained from the equation of the shadow plane 14, ax+by+c+d=0, and dx, dy, and dz represent the distance from a point to the shadow plane 14. Multiplication by this matrix projects each polygon onto the shadow plane 14, thus projecting the teapot model 10 onto the shadow plane 14.

After projecting the teapot model 10 onto the shadow plane 14, the shadow projection method adjusts colors and textures of each polygon of the teapot model in relation to the objects that were shadowed. In the example shown, only the relation between the polygons of the teapot model itself is shown without showing any interaction of the tea pot model with other objects. This simplification more easily illustrates a disadvantage of using the shadow projection method for generating realistic images, as will be described below.

The adjustment of colors and textures for the teapot model 10 is accomplished by blending each polygon into- the scene. In general, blending is the linear combination of the color for two object's pixels that overlap. Each object has associated alpha values that represent the color for each individual pixel of the object along with the degree of transparency. When two objects are blended, for each pixel that overlaps, one object is considered a top object and the other object is considered a bottom object. Blending results in any pixel whose top object pixel alpha value is non-transparent, taking on the top object's pixel color. Blending results in a linear combination of both the top and bottom objects' pixel color when the top object pixel alpha value has any degree of transparency. Typically, a polygon covers several pixels selected so that each pixel's alpha value representing the color and transparency are the same. Therefore, the alpha value of each polygon represents the alpha value for each individual pixel in the associated polygon.

As a result, because each of the polygons have an alpha value designating some degree of transparency, the resultant teapot shadow will have darker areas where two or more polygons overlapped and the overlapped pixels were linearly blended. Such darker areas, shown generally at 25 and 26, are visual artifacts generated by the shadow projection method and are not desirable because the darker areas destroy the realism of the image. These darker areas will occur even when back-face culling is performed. Another disadvantage of the shadow projection method is the inefficiency of clipping the resultant shadow along the edge of an object. This is due to the necessity of clipping each polygram (i.e., thousands of triangles) representing the model.

Therefore, there is a need for a 3D graphics shadow generation method that produces shadows in real time without producing an image whose quality is compromised by less intense computations or other means. The invention is directed to filling this need.

SUMMARY OF THE INVENTION

In accordance with this invention a method, a computer-readable medium, and a system for generating a shadow for a three dimensional model illuminated by a light source are provided. A projected shadow model and a projected bounding area of the model are found on a shadow plane. A screen extent is found that completely encompasses the projected bounding area. Then, once a texture map is prepared, the projected shadow model is rendered onto the texture map creating a projected shadow texture map. After the projected bounding area is prepared, the projected shadow texture map is rendered onto the projected bounding area creating a shadow texture mapped bounding area. This shadow texture mapped bounding area is then rendered into a scene. The scene with the rendered shadow texture mapped bounding area is displayed.

In accordance with further aspects of this invention, finding a projected shadow model on a shadow plane includes disabling a blended transparency option; applying a shadow projection matrix to the model that projects a shadow of the model onto the shadow plane; setting a color attribute for the projected shadow model to correspond to a desired shadow color; and setting a texture attribute for the projected shadow model to correspond to a desired shadow texture.

In accordance with other aspects of this invention, finding a projected bounding area on the shadow plane includes: finding a three-dimensional (3D) bounding volume of the model; applying a shadow projection matrix to the 3D bounding volume that projects the 3D bounding volume onto the shadow plane creating the projected bounding area; applying a view transformation to the projected bounding area; and clipping the projected bounding area against a view frustum.

In accordance with yet further aspects of this invention, preparing a texture map includes: creating the texture map with a size based on the screen extent; clearing the texture map to a non-shadow color; and setting an option that removes the non-shadow color when the texture map is rendered.

In accordance with still other aspects of this invention, preparing the projected bounding area includes: setting each vertex of the projected bounding area to a shadow alpha value; setting each vertex's texture coordinates of the projected bounding area to evenly map the texture map; disabling a perspective texture correction option; and enabling a blended transparency option.

As will be readily appreciated from the foregoing summary, the invention provides a new and improved method, apparatus and computer-readable medium: for generating a shadow for a 3D model. Even though hardware performance may make the computationally intense methods described above more feasible in the future, the more efficient method of the present invention will continue to provide advantages over other, more computationally intense, methods. One reason is the increasing desire to make more complicated and realistic images which will necessitate using the most efficient method available for rendering shadows in both real time applications and non-real time applications. Another reason is that the majority of consumers will be unable to afford the higher end computers capable of using the computationally intense methods. Rather, there will be a need to provide "higher end" quality with more computationally efficient methods.

BRIEF DESCRIPTION OF THE DRAWINGS

The foregoing aspects and many of the attendant advantages of this invention will become more readily appreciated as the same becomes better understood. by reference to the following detailed description, when taken in conjunction with the accompanying drawings, wherein:

FIGS. 9A–9H are a series of views depicting the process of the present invention illustrated in FIG. 4.

DETAILED DESCRIPTION OF THE PREFERRED EMBODIMENT

Figure 1:
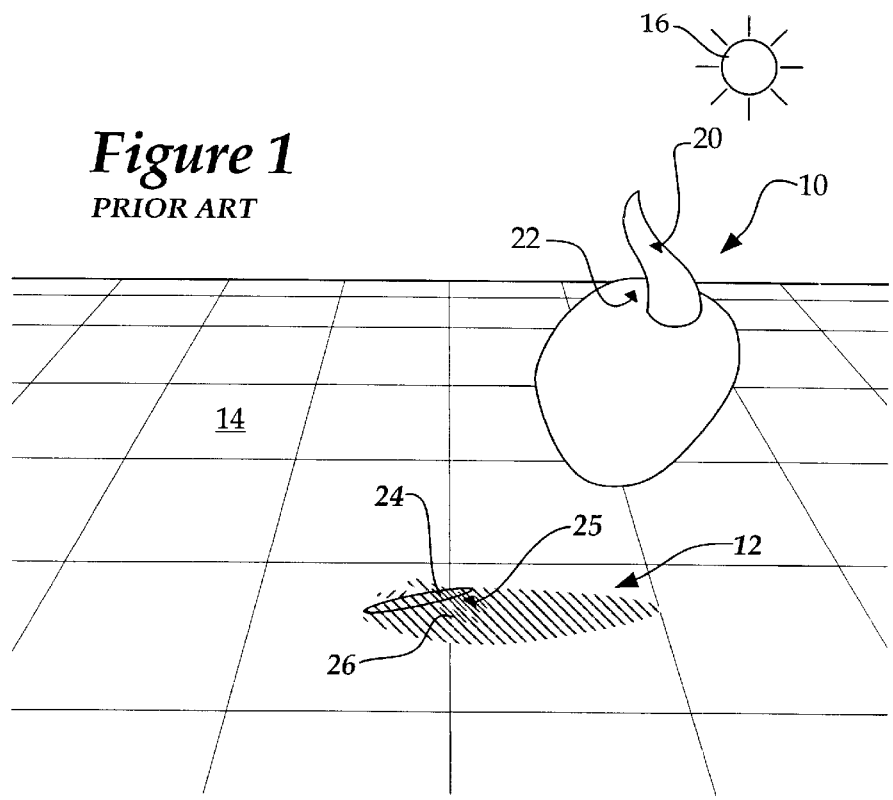
FIG. 1 is a diagram illustrating the generation of shadows cast by a teapot model using a prior art shadow projection method.
Figure 3:
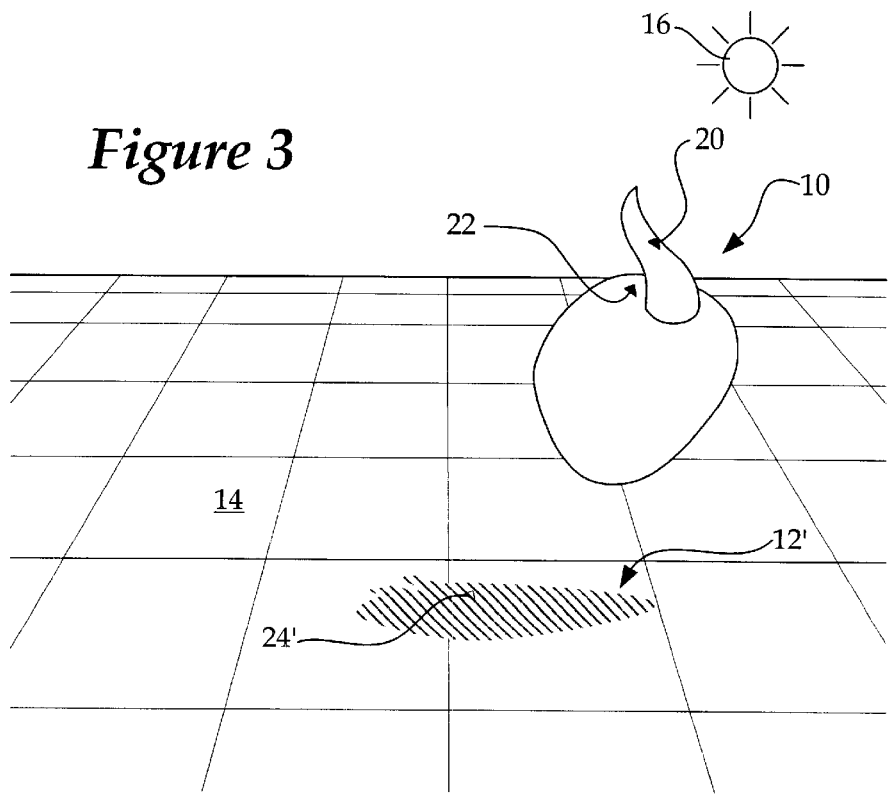
FIG. 3 is a diagram illustrating the resultant shadow cast by a teapot model using an embodiment of the present invention.

In accordance with the present invention, shadows of 3D objects are efficiently generated without any artifacts. An overview of the present invention is best understood by viewing FIG. 3 which shows a resultant shadow 12' generated on a shadow plane 14 without any visual artifacts using the process of the present invention. The model used in FIG. 3 is illuminated by the same light source 16 used in FIG. 1 and uses the same model used in FIG. 1, i.e. a tea pot model 10, oriented in the same way. Again, the interaction of the tea pot model 10 with other objects is not graphically shown.

Even though the light source 16 and teapot model 10 are the same as those used in describing the prior art shadow projection method, the present invention avoids generating dark areas on the resultant shadow 12'. The following briefly describes how the present invention accomplishes this result. First, as mentioned earlier, the teapot model 10 is represented by using several polygons that approximate the surface of the teapot model 10. After projecting the polygons representing the teapot model 10 onto the shadow plane 14 using the shadow projection matrix described above in Equation 1, the present invention disables alpha blending. Therefore, polygons that overlap (i.e. spout polygon 20 and teapot body polygon 22) do not linearly combine during blending to produce a dark area. Rather, the spout and teapot body polygons 20, 22 combine to create a desired shadow-color polygon (not shown). Typically, the desired shadow-color polygon is black with an alpha transparency of 50%. Therefore, when the desired shadow-color polygon is blended into the scene, a lighter resultant shadow polygon 24' is produced, as shown in FIG. 3. The present invention refers to the shadow projected onto the shadow plane 14 having the desired shadow-color as a projected shadow model 30 (illustrated in FIG. 9A and more fully described below). Because alpha blending does not occur during this step, the projected shadow model 30 will not be accurately blended with any objects (not shown) that were part of the scene.

Therefore, in order to achieve proper blending of all objects in the scene, in addition to the foregoing process, the present invention determines a 3D bounding volume 32 (illustrated in FIG. 9B and more fully described below) that completely encompasses the entire teapot model 10. The present invention uses a 3D bounding volume 32 with a special shape called a convex shape. A convex shape has sides categorized as either (1) fully visible or (2) fully occluded. The fully visible sides are the sides facing the viewer. By considering only the fully visible sides, the present invention ensures that no two sides will overlap and produce artifacts.

Figure 9C:
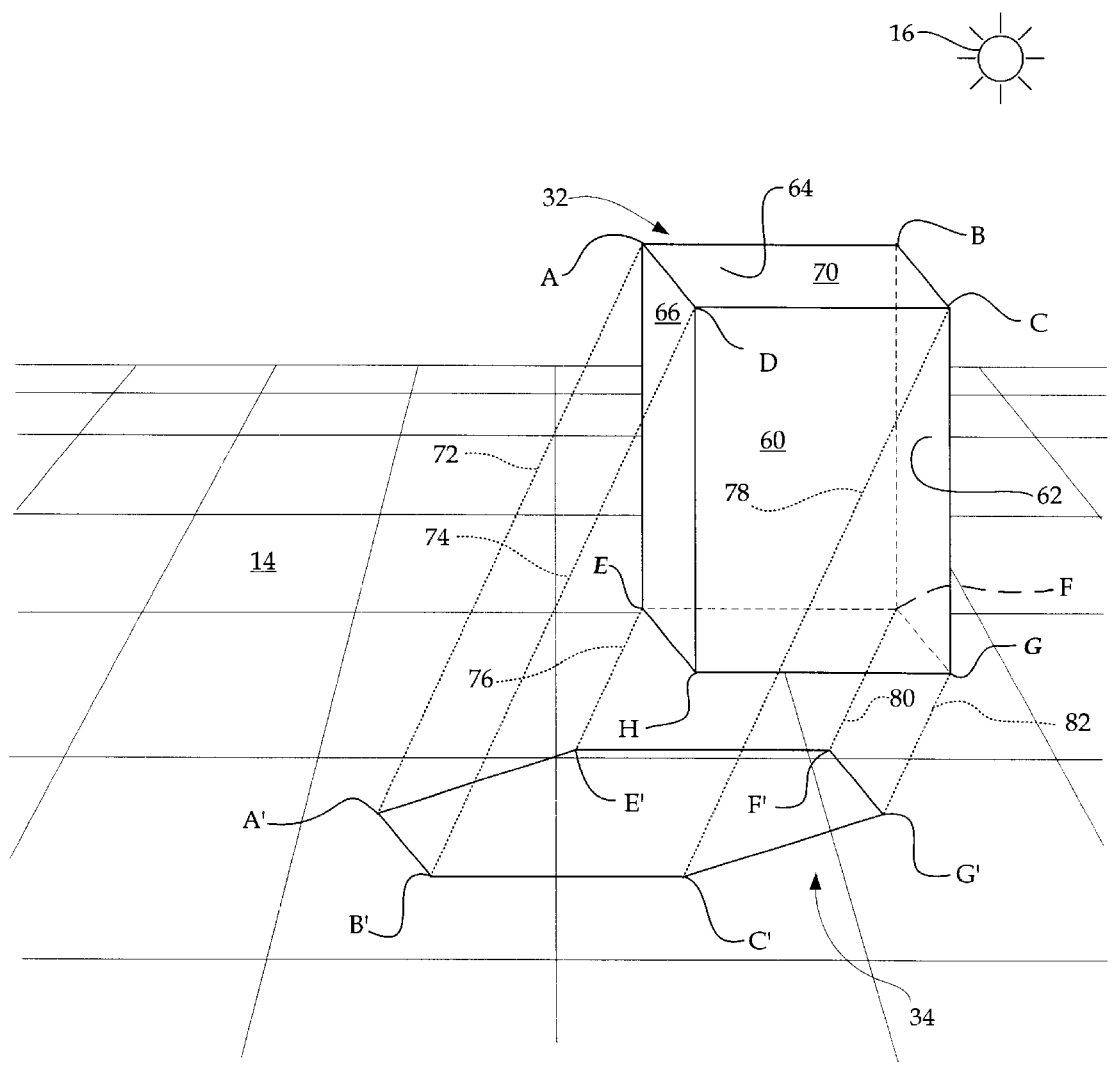

Next, the 3D bounding volume 32 is projected onto the shadow plane 14 creating a projected bounding area 34 (illustrated in FIG. 9C and more fully described below). Based on the dimensions of the projected bounding area 34, a screen extent 36 (FIG. 9D) is determined that will encompass the entire projected bounding area 34. A texture map 38 (FIG. 9E) sized relative to the screen extent 36 is created in memory for storing a shadow texture. After the texture map 38 is cleared to a non-shadow color 40 (FIG. 9F) and the projected shadow model 30 has its colors and textures set to the desired shadow color, the projected shadow model 30 is rendered onto the texture map 38 creating a shadow texture map 38'.

After this, the vertices of the projected bounding area 34 are set to the desired shadow alpha value. This transfers the semi-transparency of the model, which may not be a convex shape, onto the projected bounding volume 32, which is chosen to be a convex shape. As mentioned earlier, the use of a convex shape bounding volume ensures that no two sides overlap resulting in dark areas. In addition, texture coordinates of the projected bounding area 34 are set to evenly map texture into screen space and a chromakey is set to the selected non-shadow color 40 in the shadow texture map 38' so that the non-shadow background 40 is removed during rendering. Also, perspective texture correction is disabled and blended transparency is enabled. Once these settings are completed, the projected bounding area 34 is rendered into the scene with the shadow texture map 38' applied.

The resultant shadow 12', as shown in FIG. 3, is a blended shadow without visual artifacts. By using a rectangular 3D bounding volume 32, the projected bounding area 34 may be easily clipped against any polygon in an efficient manner. The preferred process for obtaining the benefits of the invention are described in more detail below.

Figure 2:
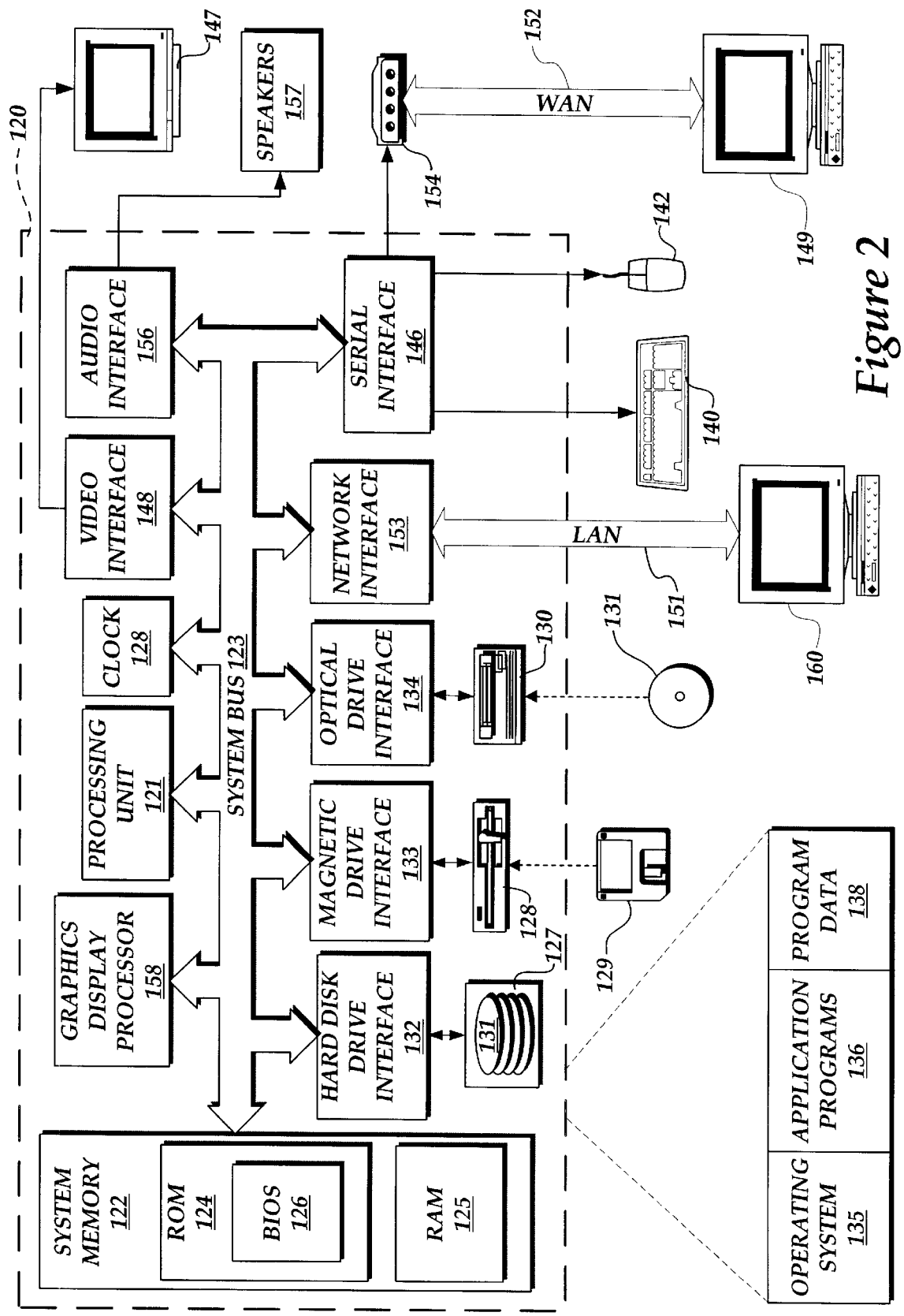
FIG. 2 is a block diagram of a graphical workstation suitable for implementing the present invention.

First, FIG. 2 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The invention may also be practiced in a graphical workstation environment wherein certain tasks are performed by a graphical display processor that is coupled to a system bus.

With reference to FIG. 2, an exemplary system for implementing the invention includes a general purpose computing device in the form of a conventional personal computer 120, including a processing unit 121, system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that helps to transfer information between elements within the personal computer 120, such as during start-up, is stored in ROM 124. The personal computer 120 further includes a hard disk drive 11137 for reading from and writing to a hard disk (not shown), a magnetic disk drive 128 for reading from or writing to a removable magnetic disk 129, and an optical disk drive 130 for reading from or writing to a removable optical disk 131, such as a CD-ROM or other optical media. The hard disk drive 11137, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer-readable instructions, data structures, program modules, and other data for the personal computer 120. Although the exemplary environment described herein employs a hard disk, a removable magnetic disk 129, and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 35, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may also be connected by other interfaces, such as a parallel port, game port or a universal serial bus (USB). A display in the form of a monitor 147 is also connected to the system bus 123 via an interface, such as a video card or adapter 148. Preferably, the video card or adapter includes a 3D rendering engine implemented in hardware. One or more speakers 157 may also be connected to the system bus 123 via an interface, such as an audio adapter 156. In addition to the display and speakers, personal computers typically include other peripheral output devices (not shown), such as printers.

The personal computer 120 may operate in a networked environment using logical connections to one or more personal computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120 or portions thereof may be stored in the remote memory storage device. It will be appreciated that the network connections shown are exemplary, and other means of establishing a communications link between the computers may be used.

When used in a graphical workstation environment, the personal computer 120 includes specialized hardware usually referred to as a graphics display processor 158. This combination of an integrated personal computer with a graphics display processor is commonly known as a graphics workstation. The graphics workstation then runs application programs 136, such as a 3D graphics application. The processing for the 3D graphics application is run in both the processing unit 121 and the graphics display processor 158. As those skilled in the art will appreciate, any processing that can be off-loaded to the graphics display processor 158 allows the graphics workstation to run more efficiently.

Figure 4:
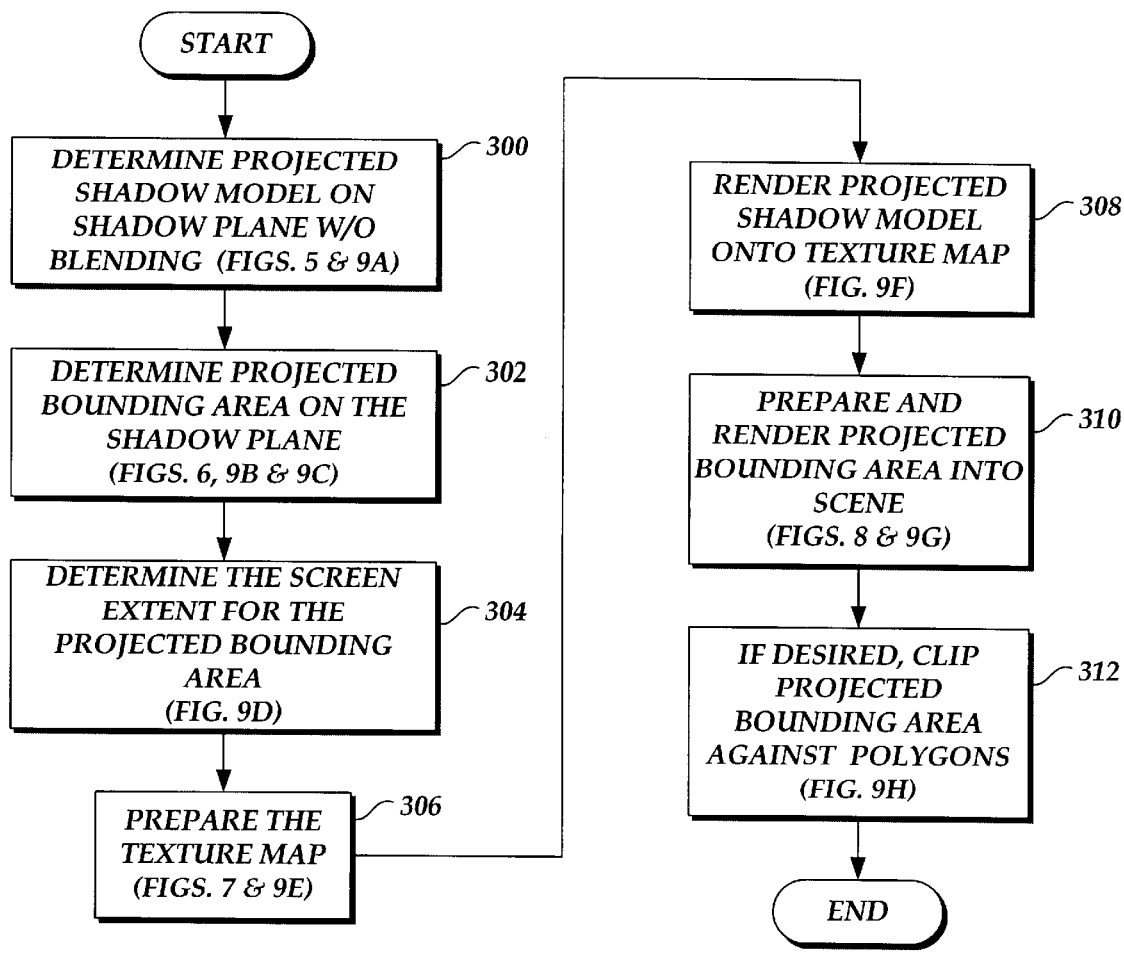
FIG. 4 is a flow diagram illustrating an overview of the process of the present invention for generating shadows.

The present invention, implemented on a system of the type illustrated in FIG. 2 and described above, efficiently generates a resultant shadow 12' of a teapot model 10 without introducing artifacts, such as dark areas, as illustrated in FIG. 3. FIG. 4 is a flow diagram illustrating an overview of the process of the present invention for generating shadows of a three-dimensional teapot model without producing any artifacts. Even though the processing completed in each of the blocks would not typically be visible on the screen, each of the blocks have at least one figure number (9A–9H) referenced within the block that denotes a figure providing a graphical visualization of the result obtained after completing the process covered by the referenced block. In addition, a block may have an additional figure number referenced within the block that provides a more detailed flow diagram of the processing for that block. The processing that occurs in each block typically manipulates attributes in memory for a primitive, such as the primitives for modeling the projected shadow teapot model (i.e. lines, rectangles, polygons). As one skilled in the art will recognize, the exact manner of manipulation of the attribute is a function of the chosen implementation based on the graphical application used.

Also, the present invention will handle shadows generated using either a point light source or a non-point light source. A point light at infinity is referred to as a "directional light" having all the light rays parallel from one direction. A point light not at infinity is referred to as a "point light" source having all the light rays radiating from the point light. In describing the method of the present invention, a "directional light" has been chosen. Therefore, FIGS. 9A–G graphically illustrate the processing when a "directional light" is chosen. However, if a "point light" is used, any reference to the shadow projection matrix (eq. 1) should use the following shadow projection matrix:

$$\begin{bmatrix} a*Lx-g & 0 & 0 & a \\ 0 & b*Ly-g & 0 & b \\ 0 & 0 & c*Lz-g & c \\ d*Lx & d*Ly & d*Lz & d-g \end{bmatrix} \quad (3)$$

where a, b, c, and d are variable obtained from the equation of the shadow plane 14, ax+by+c+d=0; Lx, Ly, and Lz represent the position of the "point light"; and g=a*Lx+b*Ly+c*Lz+d. Multiplication by this matrix projects each polygon onto the shadow plane 14, thus projecting the teapot model 10 onto the shadow plane 14 simulating the effects of a "point light" source.

As illustrated in FIG. 4, in order to achieve a shadow generated by the method of the present invention, a projected shadow teapot model is determined by projecting the teapot model onto a shadow plane. See block 300. Briefly, this projected shadow teapot model is generated without using alpha blending and then setting the color of the projected shadow teapot model to a desired shadow color.

Figure 5:
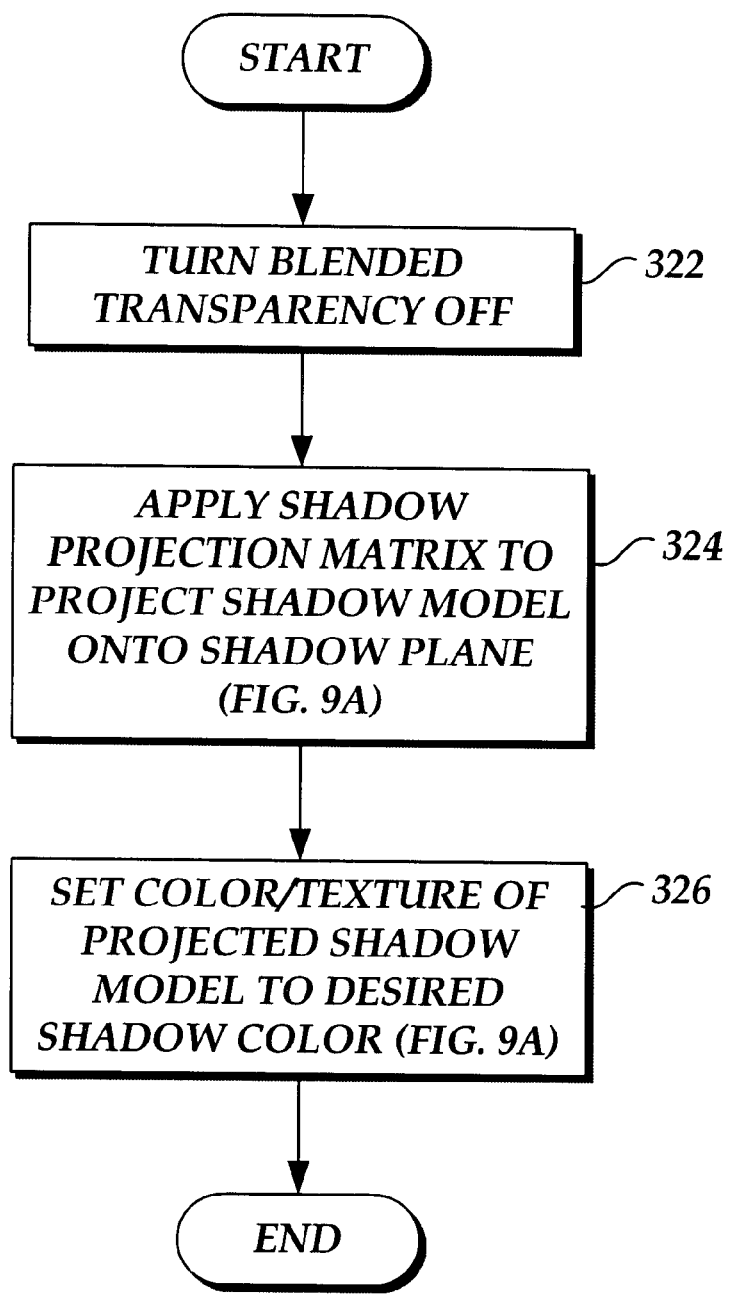
FIG. 5 is a flow diagram illustrating a process of determining a projected shadow teapot model on a shadow plane without alpha blending suitable for use in the process shown in FIG. 4.

Now, referring to FIG. 5, a flow diagram illustrating a process of determining a projected shadow teapot model on the shadow plane without alpha blending suitable for use in process block 300 shown in FIG. 4 is illustrated in more detail. At block 322, blended transparency is turned off so that any polygons representing the teapot model which overlap do not combine and create a dark area. Each polygon representing the teapot model 10 is then projected onto the shadow plane 14 creating a projected shadow teapot model. See block 324. If a "directional light" source is used, the shadow projection matrix of Equation 1 above is used. Whereas the shadow projection matrix of Equation 3 is used if there is a "point light" source. When applying either shadow projection matrix, perspective is applied so that the proper foreshortening occurs. This provides visual realism to the 2D view.

At block 326, a color and texture of each of the polygons representing the projected shadow teapot model is set to represent the desired shadow-color. Typically, the desired shadow-color may be black and the texture is set to represent no texture (i.e., a null texture). As mentioned earlier, this processing is performed in the computer by storing attributes for primitives representing the projected shadow teapot model in memory. While not shown on a display screen, FIG. 9A provides a graphical illustration of a teapot model 10 casting a shadow (the projected shadow teapot model 30) on the shadow plane 14 as a result of the teapot model blocking rays (not shown) from a light source 16.

Figure 6:
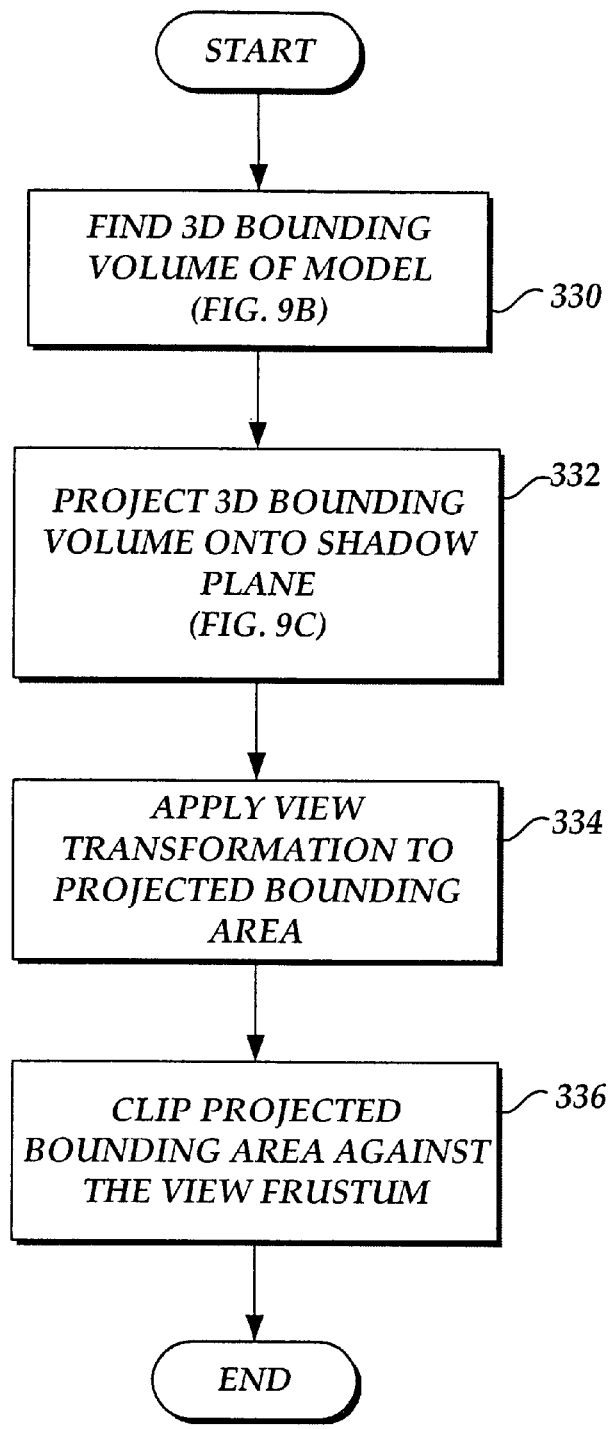
FIG. 6 is a flow diagram illustrating a process of determining the projected bounding area on a shadow plane suitable for use in the process shown in FIG. 4.

Now, referring back to FIG. 4, at block 302, a projected bounding area is determined on the shadow plane. FIG. 6 is a flow diagram illustrating a process of determining the projected bounding area on the shadow plane suitable for use in the process shown in block 302 of FIG. 4. At block 330, a three-dimensional (3D) bounding volume is found that completely encapsulates the teapot model. The present invention uses a 3D bounding volume 32 with a special shape called a convex shape. As described earlier, a convex shape has sides categorized as either (1) fully visible or (2) fully occluded. The fully visible sides are the sides facing the viewer. Later, when projecting the 3D convex shape bounding volume onto the shadow plane, only the fully visible sides are projected. Thus, the present invention ensures that no two sides will overlap and produce artifacts.

As one skilled in the art will appreciate, the 3D bounding volume may include a variety of shapes and sizes (i.e. spherical, rectangular). In a preferred embodiment, the 3D bounding volume dimensions are selected to be only slightly larger than the outer dimensions of the teapot model. This minimizes the number of additional objects contained within the 3D bounding volume and reduces the processing complexity involved in clipping and blending the 3D bounding volume into the scene.

FIG. 9B graphically illustrates the processing carried out in block 330. As shown, the 3D bounding volume 32 is a right rectangular parallelepiped that completely encompasses the entire teapot model 10. The 3D bounding volume 32 includes two parallel end sides 68 70, both rectangularly shaped. From each edge of parallel end sides 68 70 are one of walls 60, 62, 64, 66. Walls 60, 62, 64, 66 are two pair of parallel walls forming sidewalls of a rectangular box. As described earlier, in preferred form, the 3D bounding volume 32 is the minimal right rectangular parallelepiped volume that still encompasses the entire teapot model 10.

Now referring back to FIG. 6, at block 332, the 3D bounding volume is projected onto the shadow plane using the shadow projection matrix described above in either Equation 1 or 3, depending on the light source used. When applying either shadow projection matrix, perspective is applied so that the proper foreshortening occurs. This provides visual realism to the 2D view. FIG. 9C graphically illustrates the outcome of the processing at block 332. In FIG. 9C, vertices of the 3D bounding volume have been referenced with letters A–H. The four vertices for first end 70 are a back-left vertices A, a back right vertices B, a front-right vertices C, and a front-left vertices D. The vertices of second end 68 are similarly labeled with a back-left vertices E, a back right vertices F, a front-right vertices G, and a front-left vertices H. As shown, these vertices have been projected onto the shadow plane 14 to create a projected bounding area 34. Vertices of the projected bounding area A'–G' correspond to the vertices of the 3D bounding volume having the same letter (i.e. A' is A projected onto the shadow plane). Dashed lines 72, 74, 76, 78, 80, 82 represent the projection of vertices A, D, E, C, F, G to the corresponding projected bounding area vertices A', D', E', C', F', G'.

Now referring back to FIG. 6, at block 334, after the 3D bounding volume has been projected onto the shadow plane, a view transformation is applied to the projected bounding area to convert the projected bounding area into view space. This viewing transformation, also called the view-orientation matrix, transforms the vertices into a coordinate system having an origin at the viewer's eye. In this coordinate system, the z-axis points in the direction of the viewer's eye, the x-axis points to the viewer's left and y-axis points upward. This view-orientation matrix is well-known in the art. As one skilled in the art would recognize, the view-orientation matrix is the inverse of a World Transformation of viewer's frame.

Once the projected bounding area is in view space, at block 336, the projected bounding area is clipped against the view frustum or clipping volume so that objects only in the projected bounding area are considered. By having the projected bounding area in view space, this clipping does not change if the viewer moves or looks in a different direction as would occur in world space. This clipping is well-known in the art and decreases the computation necessary for performing the present invention. The clipping may be done using the well-known Sutherland-Hodgman clipping method.

Figure 9D:
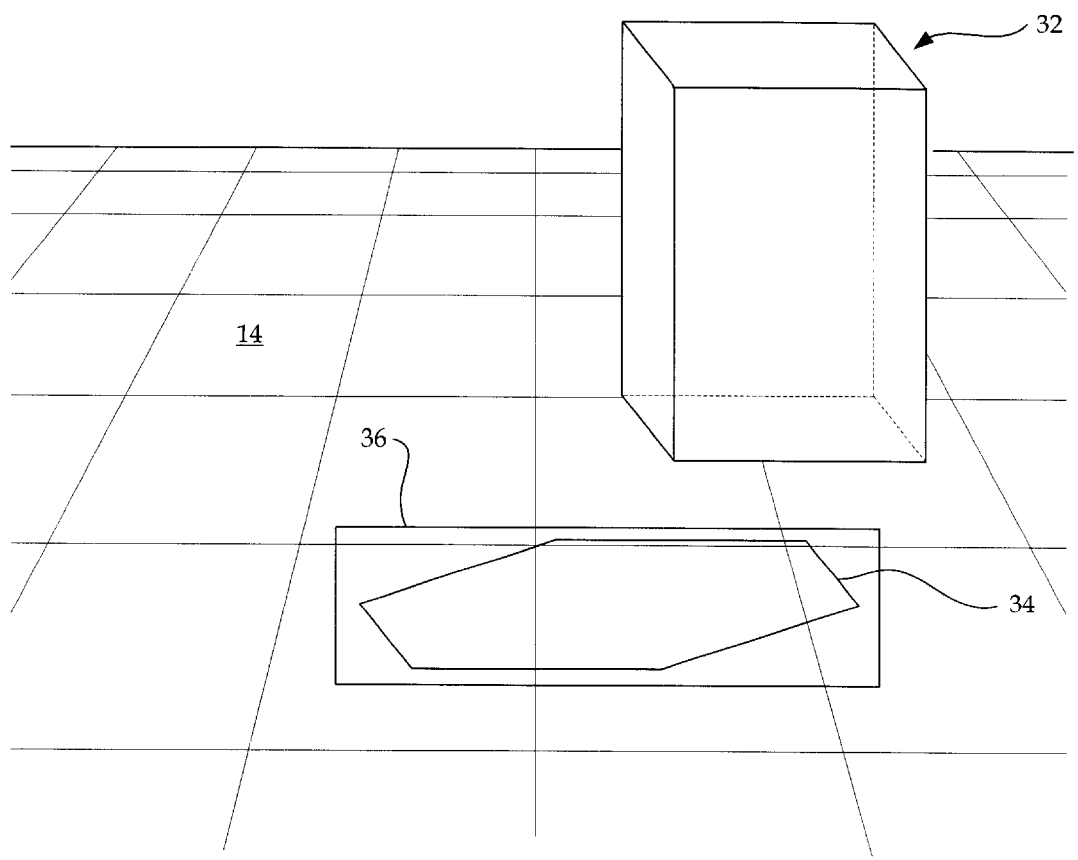

Now, referring back to FIG. 4, at block 304, a screen extent is determined based on the projected bounding area. The screen extent is selected so that it completely encompasses the entire projected bounding area. In a preferred embodiment, the screen extent is selected so that the area of the screen extent is the minimum area that will completely encompass the entire projected bounding area. This avoids unnecessary clipping and unnecessary comparisons between objects that are not located proximate to the projected bounding area on the shadow plane. FIG. 9D graphically illustrates a screen extent 36. As shown, the screen extent 36 completely encompasses the entire projected bounding area 34 while minimizing the area within the projected bounding area 34.

Figure 7:
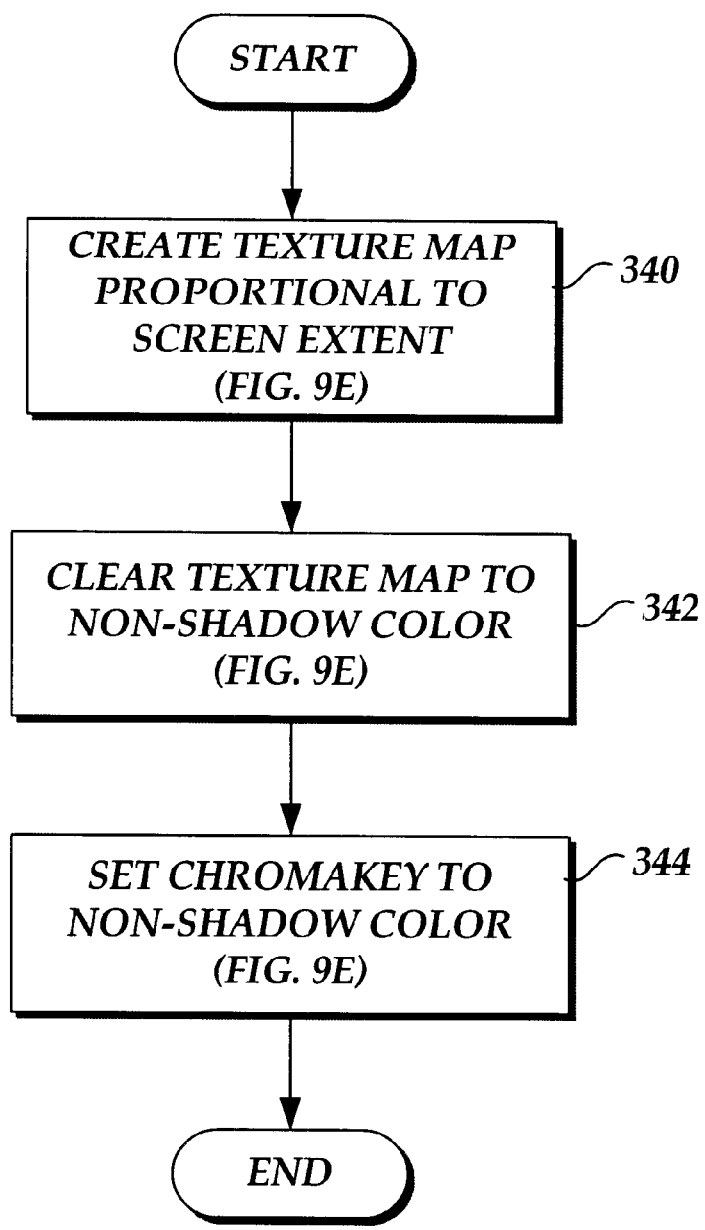
FIG. 7 is a flow diagram illustrating a process of preparing a texture map suitable for use in the process shown in FIG. 4.

Next, referring back to FIG. 4, at block 306, a texture map is prepared for later rendering of the projected shadow teapot model. FIG. 7 is a flow diagram illustrating a process of preparing a texture map suitable for use in the process shown in block 306 of FIG. 4. At block 340, a texture map is created that is sized relative to the screen extent previously determined. Then, at block 342, the texture map is cleared to a non-shadow color. Any non-shadow color may be chosen for the texture map background, as long as the color chosen is not a color that will appear in the shadowed teapot model.

Next, at block 344, a chromakey, which is well-known in the art, is set to the chosen non-shadow color. As one skilled in the art will appreciate, the chromakey prevents the non-shadow color from blending with other object's colors when the texture map is later rendered into the scene.

Figure 9E:
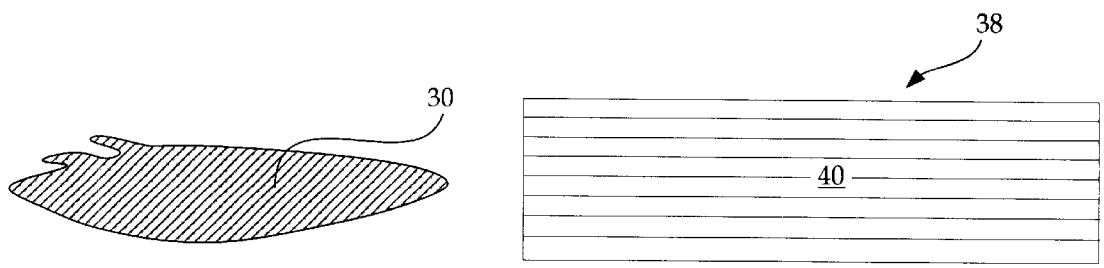

FIG. 9E is a graphical illustration of the outcome of the above processing steps. In FIG. 9E, on the right, a texture map 38 is shown. While, as shown, the texture map 38 is equal in size to the previously determined screen extent 36, those skilled in the art will recognize that the texture map 38 may be sized differently than the screen extent 36. If this is done, the difference in size is later taken into consideration when rendering the projected shadow teapot model 30 onto the texture map 38. In this situation, the projected shadow teapot model 30 would be multiplied by a scaling factor that compensates for the difference in size before rendering the projected shadow teapot model 30 onto the texture map 38. As shown, the non-shadow color 40 completely covers the entire texture map 38. The non-shadow color 40 is represented by horizontal lines and would typically be a solid color such as white. As mentioned earlier, because the chromakey is set to the non-shadow color 40, when the texture map 38 is rendered later into a scene, the chromakey will remove the non-shadow color (i.e., the background color), thus preventing the non-shadow color from blending into the scene.

Figure 9F:
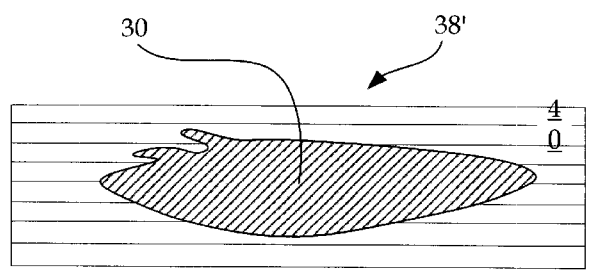

Referring back to FIG. 4, at block 308, the projected shadow model is rendered onto the texture map creating a projected shadow texture map. FIG. 9F graphically illustrates the outcome of block 308. As shown, the projected shadow model 30 is rendered onto the texture map 38 of FIG. 9E having the non-shadow color 40 as a background. The result is the projected shadow texture map 38' shown in FIG. 9F having the projected shadow model 30 mapped onto the texture map 38 with the background remaining as the non-shadow color 40.

Figure 8:
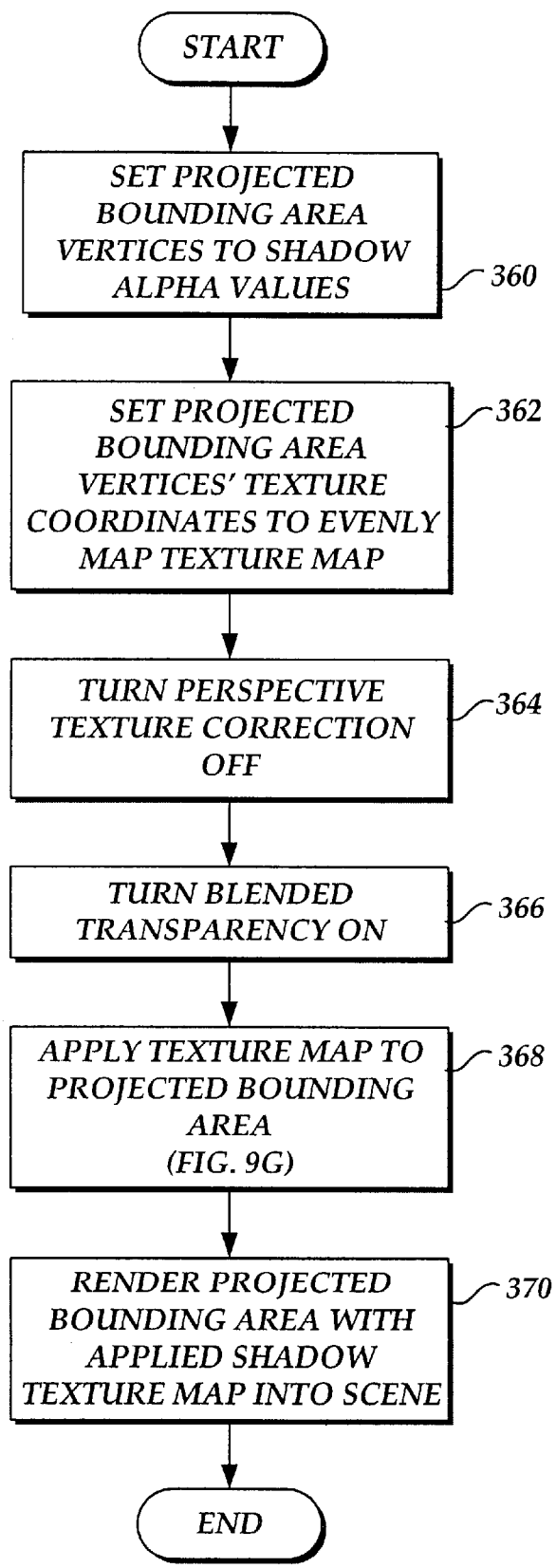
FIG. 8 is a flow diagram illustrating a process of preparing and rendering the projected bounding area in a scene suitable for use in the process shown in FIG. 4.

Now, referring back to FIG. 4, at block 310, the projected bounding area is prepared and rendered into the scene. FIG. 8 is a flow diagram illustrating a process of preparing and rendering the projected bounding area in a scene suitable for use in the process shown in block 310 of FIG. 4. At block 360, the projected bounding area vertices are set to the shadow alpha values. This transfers the shadow alpha properties of the model, which may not be a convex shape, to the alpha properties of the bounding volume selected to be a convex shape. As mentioned earlier, by considering only the fully visible sides of the convex shape, the present invention ensures that no two sides will overlap and produce artifacts.

In addition, at block 362, the projected bounding area vertices' texture coordinates are set to evenly map the projected shadow texture map. When performing this step, the screen coordinates calculated for the screen extent are used to determine the texture coordinates. This reduces the processing of new screen coordinates. For example, if the screen extent is (x0, y0)–(x1, y1) for the projected bounding area, the texture u and v coordinates for a given bounding area vertex (sx, sy) is given by the equation below:

$$u = \frac{sx - x_0}{x_1 - x_0}, \quad (2)$$
$$v = \frac{sy - y_0}{y_1 - y_0}.$$

At block 364, the perspective texture correction is turned off so that the perspective correction is not reapplied when rendering the projected shadow texture map into the scene. This prevents an error from being introduced in the visual representation of the shadowed teapot model. At block 366, the blended transparency is turned on to allow pixels on the projected shadow texture map to linearly blend with the pixels of the scene.

Figure 9G:
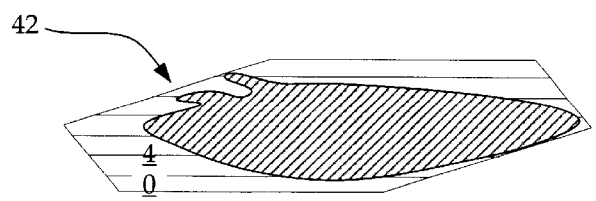

Next, at block 368, the projected shadow texture map is applied to the projected bounding area creating a shadow texture mapped projected bounding area. FIG. 9G illustrates the outcome after block 368. The shadow texture mapped projected bounding area 42 is shown having the non-shadow color 40 still as the background with the shadow texture map 38' applied. Next, in block 370 of FIG. 8, the projected bounding area with the applied shadow texture map is rendered into the scene. Because the chromakey is set, the non-shadow color 40 is removed. Therefore, the color of any objects in the scene are accurately reflected.

The resultant shadow after all the steps of the present invention have been completed is shown in FIG. 3. As shown, the resultant shadow 12' does not have any dark patches and is lighter than the desired shadow color (black) due to an alpha transparency of approximately 50%.

Even though FIG. 3 does not illustrate the resultant shadow 12' interacting with other objects in the scene, those skilled in the art will recognize that the method of the present invention efficiently and effectively handles this situation by blending the projected bounding area with the correctly colored and textured shadow teapot model into the scene.

Figure 9H:
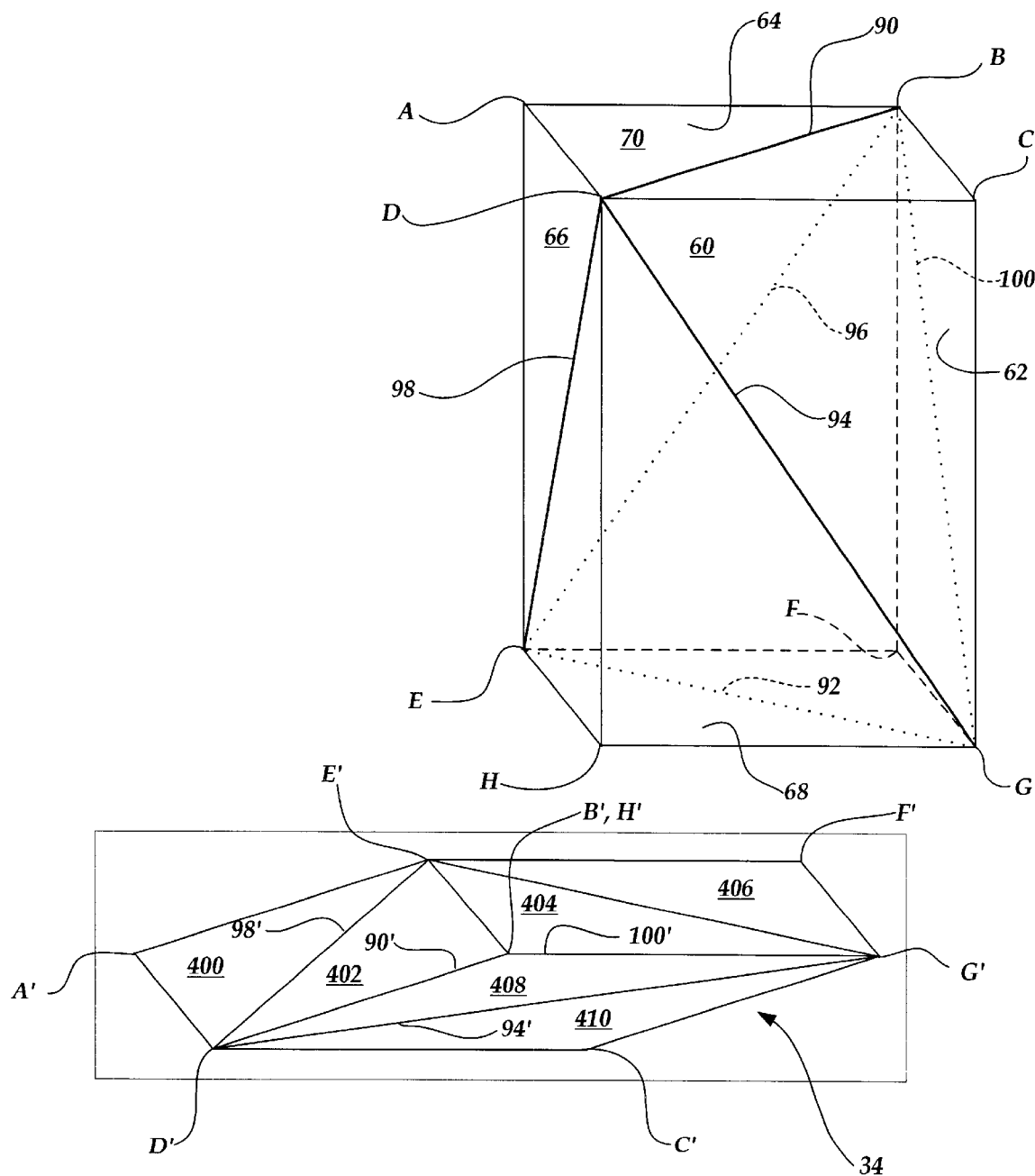

Again, referring back FIG. 4, optional processing, shown at block 312, allows the projected bounding area with the shadow teapot model to be clipped against any polygon, if desired. This additional clipping feature is achieved by selecting a bounding volume around the teapot model that is rectangularly-shaped. FIG. 9H graphically illustrates an advantage of the preferred embodiment when a rectangular bounding volume is selected. As shown, each end 68, 70 and side wall 62, 64, 66, 68 has a diagonal 90, 92, 94, 96, 98, 100 dividing the end or side wall into two equal triangles, resulting in a total of twelve triangles. As shown, the diagonals 90, 92, 94, 96, 98, 100 originate or end from only vertices B, D, E and G. For example, side wall 60 has diagonal 94 dividing it into two equal triangles, DGC, and DGH. When each of these diagonals are then projected onto the shadow plane 14, six triangles 400 (A'D'E'), 402(D'E'B'), 404(E'B'G'), 406(E'G° F'), 408(D'G'B'), 410(D'G' C') appear on the shadow plane 14 within the projected bounding area 34. The other six triangles can not be seen because they are directly behind the top six triangles. The projected shadow teapot model (not shown) may then be clipped in each triangle using a well-known clipping algorithm, such as Sutherland-Hodgman clipping algorithm.

As one skilled in the art would appreciate, the processing performed in the blocks of FIG. 4 may be performed in a different order than represented. For example, block 300, determining the projected shadow teapot model on the shadow plane, may be performed after 302, 304, 306 or even during one of those processing blocks, as long as the processing of block 300 is completed before block 308. Therefore, the blocks shown in FIG. 4 do not represent a sequential order for performing this invention but rather indicate the necessary processing that must be completed to achieve the outcome of the present invention. Only when one of the blocks needs an output from an earlier block, is the relative processing order determined.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating a shadow for a three-dimensional model illuminated by a light source, said method comprising:
   (a) finding a projected shadow model on a shadow plane;
   (b) finding a convex-shaped bounding volume for the model;
   (c) finding a projected bounding area on the shadow plane based on the convex-shaped bounding volume;
   (d) finding a screen extent that completely encompasses the projected bounding area;
   (e) preparing a texture map;
   (f) rendering the projected shadow model onto the texture map creating a projected shadow texture map;
   (g) preparing the projected bounding area;
   (h) rendering the projected shadow texture map in the projected bounding area creating a shadow texture mapped bounding area;
   (i) rendering the shadow texture mapped bounding area into a scene; and
   (j) displaying the scene with the rendered shadow texture mapped bounding area.

2. The method of claim 1, wherein finding a projected shadow model on a shadow plane comprises:
   (a) disabling a blended transparency option;
   (b) applying a shadow projection matrix to the model that projects a shadow of the model onto the shadow plane;
   (c) setting a color attribute for the projected shadow model to correspond to a desired shadow color; and
   (d) setting a texture attribute for the projected shadow model to correspond to a desired shadow texture.

3. The method of claim 2, wherein finding a projected bounding area on the shadow plane comprises:
   (a) applying a shadow projection matrix to the convex-shaped bounding volume that projects the convex'shaped bounding volume onto the shadow plane creating the projected bounding area;
   (b) applying a view transformation to the projected bounding area; and
   (c) clipping the projected bounding area against a view frustum.

4. The method of claim 3, wherein preparing a texture map comprises:
   (a) creating the texture map with a size based on the screen extent;
   (b) clearing the texture map to a non-shadow color; and
   (c) setting an option that removes the non-shadow color when the texture map is rendered.

5. The method of claim 4, wherein preparing the projected bounding area comprises:
   (a) setting each vertex of the projected bounding area to a shadow alpha value;
   (b) setting each vertex's texture coordinates of the projected bounding area to evenly map the texture map;
   (c) disabling a perspective texture correction option; and
   (d) enabling a blended transparency option.

6. The method of claim 2, wherein preparing a texture map comprises:
   (a) creating the texture map with a size based on the screen extent;
   (b) clearing the texture map to a non-shadow color; and
   (c) setting an option that removes the non-shadow color when the texture map is rendered.

7. The method of claim 6, wherein preparing the projected bounding area comprises:
   (a) setting each vertex of the projected bounding area to a shadow alpha value;
   (b) setting each vertex's texture coordinates of the projected bounding area to evenly map the texture map;
   (c) disabling a perspective texture correction option; and
   (d) enabling a blended transparency option.

8. The method of claim 3, wherein preparing the projected bounding area comprises:
   (a) setting each vertex of the projected bounding area to a shadow alpha value;
   (b) setting each vertex's texture coordinates of the projected bounding area to evenly map the texture map;
   (c) disabling a perspective texture correction option; and
   (d) enabling a blended transparency option.

9. The method of claim 1, wherein finding a projected bounding area on the shadow plane comprises:
   (a) applying a shadow projection matrix to the convex-shaped bounding volume that projects the convex-shaped bounding volume onto the shadow plane creating the projected bounding area;
   (b) applying a view transformation to the projected bounding area; and
   (c) clipping the projected bounding area against a view frustum.

10. The method of claim 9, wherein preparing a texture map comprises:
    (a) creating the texture map with a size based on the screen extent;
    (b) clearing the texture map to a non-shadow color; and
    (c) setting an option that removes the non-shadow color when the texture map is rendered.

11. The method of claim 10, wherein preparing the projected bounding area comprises:
    (a) setting each vertex of the projected bounding area to a shadow alpha value;
    (b) setting each vertex's texture coordinates of the projected bounding area to evenly map the texture map;
    (c) disabling a perspective texture correction option; and
    (d) enabling a blended transparency option.

12. The method of claim 9, wherein preparing the projected bounding area comprises:
    (a) setting each vertex of the projected bounding area to a shadow alpha value;
    (b) setting each vertex's texture coordinates of the projected bounding area to evenly map the texture map;
    (c) disabling a perspective texture correction option; and
    (d) enabling a blended transparency option.

13. The method of claim 1, wherein preparing a texture map comprises:
    (a) creating the texture map with a size based on the screen extent;
    (b) clearing the texture map to a non-shadow color; and
    (c) setting an option that removes the non-shadow color when the texture map is rendered.

14. The method of claim 13, wherein preparing the projected bounding area comprises:
    (a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

15. The method of claim 1, wherein preparing the projected bounding area comprises:

(a) setting each vertex of the:projected bounding area to a shadow alpha value;

(b) setting each vertex's texture coordinates of the projected bounding area to evenly map the texture map;

(c) disabling a perspective texture correction option; and (d) enabling a blended transparency option.

16. A computer-readable medium for performing the method in any one of claims 1–15.

17. A system for generating a shadow for a three-dimensional model illuminated by a light source, said system comprising:

a display device;

a memory; and a processor with hardware and software components for:
 (a) finding a projected shadow model on a shadow plane;
 (b) finding a convex-shaped bounding volume for the model;
 (c) finding a projected bounding area on the shadow plane based on the convex-shaped bounding volume;
 (d) finding a screen extent that completely encompasses the projected bounding area;
 (e) preparing a texture map;
 (f) rendering the projected shadow model onto the texture map creating a projected shadow texture map;.
 (g) preparing the projected bounding area;
 (h) rendering the projected shadow texture map in the projected bounding area creating a shadow texture mapped bounding area;
 (i) rendering the shadow texture mapped bounding area into a scene; and
 (j) displaying the scene with the shadow texture mapped bounding area on the display device.

18. The system of claim 17, wherein the processor finds a projected shadow model on a shadow plane by:

(a) disabling a blended transparency option;

(b) applying a shadow projection matrix to the model that projects a shadow of the model onto the shadow plane;

(c) setting a color attribute for the projected shadow model to correspond to a desired shadow color; and (d) setting a texture attribute for the projected shadow model to correspond to a desired shadow texture.

19. The system of claim 18, wherein the processor finds a projected bounding area on the shadow plane by:

(a) applying a shadow projection matrix to the convex-shaped bounding volume that projects the convex-shaped bounding volume onto the shadow plane creating the projected bounding area;

(b) applying a view transformation to the projected bounding area; and (c) clipping the projected bounding area against a view frustum.

20. The system of claim 19, wherein the processor prepares a texture map by:

(a) creating the texture map in a memory with a size based on the screen extent;

(b) clearing the texture map to a non-shadow color; and (c) setting an option that removes the non-shadow color when the texture map is rendered.

21. The system of claim 20, wherein the processor prepares the projected bounding area by:

(a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

22. The system of claim 18, wherein the processor prepares a texture map by:

(a) creating the texture map in a memory with a size based on the screen extent;

(b) clearing the texture map to a non-shadow color; and (c) setting an option that removes the non-shadow color when the texture map is rendered.

23. The system of claim 22, wherein the processor prepares the projected bounding area by:

(a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

24. The system of claim 18, wherein the processor prepares the projected bounding area by:

(a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

25. The system of claim 17, wherein the processor finds a projected bounding area on the shadow plane by:

(a) applying a shadow projection matrix to the convex-shaped bounding volume that projects the convex-shaped bounding volume onto the shadow plane creating the projected bounding area;

(b) applying a view transformation to the projected bounding area; and (c) clipping the projected bounding area against a view frustum.

26. The system of claim 25, wherein the processor prepares a texture map by:

(a) creating the texture map in a memory with a size based on the screen extent;

(b) clearing the texture map to a non-shadow color; and (c) setting an option that removes the non-shadow color when the texture map is rendered.

27. The system of claim 26, wherein the processor prepares the projected bounding area by:

(a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

28. The system of claim 19, wherein the processor prepares the projected bounding area by:

(a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

29. The system of claim 17, wherein the processor prepares a texture map by:

(a) creating the texture map in a memory with a size based on the screen extent;

(b) clearing the texture map to a non-shadow color; and (c) setting an option that removes the non-shadow color when the texture map is rendered.

30. The system of claim 29, wherein the processor prepares the projected bounding area by:

(a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

31. The system of claim 17, wherein the processor prepares the projected bounding area by:

(a) setting each vertex of the projected bounding area to a shadow alpha value;

(b) setting each vertex's texture coordinates of the projected bounding area to evenly map the texture map;

(c) disabling a perspective texture correction option; and (d) enabling a blended transparency option.

* * * * *

UNITED STATES PATENT AND TRADEMARK OFFICE
CERTIFICATE OF CORRECTION

PATENT NO. : 6,437,782 B1
DATED : August 20, 2002
INVENTOR(S) : I.B. Pieragostini et al.

It is certified that error appears in the above-identified patent and that said Letters Patent is hereby corrected as shown below:

Title page,
Item [56], References Cited, OTHER PUBLICATIONS, insert in appropriate order:
-- OTHER PUBLICATIONS
Foley et al., *Computer-Graphics: Principles and Practice*, 2nd Ed., pp. 745-753, Addison-Wesley, New York (1990).
Woo et al., *OpenGL Programming Guide: The Official Guide to Learning Opengl, Version 1.1*, 2nd Ed., pp. 519-521, and 593-598, Addison-Wesley Developers Press, Reading MA (1997). --

Column 1,
Line 13, "common place" should read -- commonplace --

Column 2,
Line 56, "are variable" should read -- are variables --

Column 3,
Line 6, "into-" should read -- into --
Line 23, "polygons have" should read -- polygons has --

Column 4,
Line 26, "medium: for" should read -- medium for --
Line 44, "understood. by" should read -- understood by --

Column 6,
Line 62, "that helps" should read -- that help --
Line 65, "11137" should read -- 127 --

Column 7,
Line 3, "11137" should read -- 127 --

Column 8,
Line 21, "blocks have" should read -- blocks has --
Line 54, "are variable" should read -- are variables --

Column 9,
Line 12, "Whereas the" should read -- The --
Line 57, "68 70," should read -- 68, 70, --
Line 58, "68 70" should read -- 68, 70 --
Line 59, "two pair" should read -- two pairs --

UNITED STATES PATENT AND TRADEMARK OFFICE
CERTIFICATE OF CORRECTION

PATENT NO. : 6,437,782 B1
DATED : August 20, 2002
INVENTOR(S) : I.B. Pieragostini et al.

It is certified that error appears in the above-identified patent and that said Letters Patent is hereby corrected as shown below:

Column 10,
Line 10, "back right" should read -- back-right --
Lines 29 and 39, "well-known" should read -- well known --

Column 11,
Line 1, "well-known" should read -- well known --

Column 12,
Line 33, "rectangularly-shaped" should read -- rectangularly shaped --
Line 42, "diagonals are" should read -- diagonals is --
Line 44, "406(E'G°F')," should read -- 406(E'G'F'), --
Line 46, "can not" should read -- cannot --

Column 13,
Line 15, "(i)" should read -- (f) --
Line 40, "convex'shaped" should read -- convex-shaped --

Column 15,
Line 7, "the:projected" should read -- the projected --
Line 34, "map;." should read -- map; --

Signed and Sealed this

Eighth Day of April, 2003

JAMES E. ROGAN
*Director of the United States Patent and Trademark Office*